United States Patent [19]

Ozeki et al.

[11] 3,925,735

[45] Dec. 9, 1975

[54] MODULATION APPARATUS OF SEMICONDUCTOR LASER DEVICE

[75] Inventors: Takeshi Ozeki; Takao Ito, both of Tokyo, Japan

[73] Assignee: Tokyo Shibaura Electric Co., Ltd., Kawasaki, Japan

[22] Filed: Mar. 26, 1974

[21] Appl. No.: 455,026

[30] Foreign Application Priority Data

Mar. 27, 1973 Japan .............................. 48-34934

[52] U.S. Cl. ............... 332/7.51; 307/268; 307/312; 331/94.5 H

[51] Int. Cl.² ......................... H01S 3/19; H01S 3/10

[58] Field of Search ........... 307/268, 312; 332/11 R, 332/11 D, 7.51; 325/141, 105; 331/94.5 H

[56] References Cited

UNITED STATES PATENTS

| | | | |
|---|---|---|---|
| 3,478,280 | 11/1969 | Fenner | 332/7.51 |
| 3,551,840 | 12/1970 | Crowell | 332/7.51 X |
| 3,579,145 | 5/1971 | DeLange | 332/7.51 |
| 3,815,045 | 6/1974 | Ito | 331/94.5 H X |

*Primary Examiner*—Alfred L. Brody
*Attorney, Agent, or Firm*—Finnegan, Henderson, Farabow & Garrett

[57] ABSTRACT

A combination of "0" and "1" of a plurality of bits in PCM (pulse code modulation) signal is detected to reduce the PCM pattern effect of laser outputs resulting from the direct current modulation of a semiconductor laser device by PCM current pulses. Compensation pulses are formed when a succeeding bit is "1" and when at least one preceding bit is "0." The compensation current pulse is superposed on the modulation current pulse of the succeeding bit applied to the laser device.

10 Claims, 4 Drawing Figures

MODULATION APPARATUS OF SEMICONDUCTOR LASER DEVICE

This invention relates to a modulating apparatus of a semiconductor laser device and more particularly to apparatus for modulating the laser output by applying PCM current pulses to the semiconductor laser device.

The semiconductor laser is featured by its easy modulation. However, it often gives rise to the PCM pattern effect, in which the modulated output waveforms of a semiconductor laser are different from each other due to the combination of "1" and "0" in preceding bits in PCM current (PCM code pattern).

The PCM pattern effect is affected by the oscillation delay time, the prepumping effect due to the preceding bit currents, the excitation of damped oscillation, etc.

It is known that the oscillation delay time can be reduced by supplying DC bias current to the semiconductor device. From the standpoint of reliability, however, it is undesirable to supply the bias current to the laser device during the time laser oscillation is not required, and thus increase the average amount of current of the laser device. Experiment shows that the required DC bias current in the PCM current modulation at the bit rate of about 200 Mb/s ranges from ½ to ⅓ of the oscillation threshold current, thereby reducing the lifetime of the laser device. The excitation of damped oscillation also varies with varying bias current.

If the bit rate of PCM current is substantially equal to the spontaneous carrier lifetime, the carrier excited in the preceding bits will still remain so that the effective excitation due to the preceding bits will be realized. This phenomenon can be commonly called the prepumping effect which greatly affects the production of PCM pattern effect of a double heterojunction laser device in particular. Owing to the relatively long spontaneous carrier lifetime (about 5 ns) of the double heterojunction lasers, the initial condition of carrier density at each bit varies depending on the combination of "1" and "0" in the preceding bits. As a result, the excitation state of each bit varies according to different preceding bit patterns, thus varying the amplitude and phase of laser outputs.

Accordingly, the object of the present invention is to provide a semiconductor laser modulating apparatus which is capable of reducing the PCM pattern effect without DC bias current or merely with a small amount of DC bias current.

According to the semiconductor laser modulation apparatus of the invention the logical combination of at least one preceding bit and one succeeding bit is sensed, compensation pulse is formed where the succeeding bit maintains a modulation pulse and the preceding bit is in a preselected logical condition, and a driving current pulse including a modulating current pulse and a compensation current pulse superposed on the former are delivered to the semiconductor laser device.

Uniform carrier density in the period of each bit in which modulation current pulse exists can be obtained by adjusting the amplitude and the phase of the compensation current pulse with respect to the PCM current pulse, thereby reducing the PCM pattern effect.

If the bit rate of PCM current is comparable with the spontaneous carrier lifetime, say, up to 200 Mb/s, then compensation pulses have only to be generated in accordance with the condition of one preceding bit only, which is possible by the use of simple logical circuits.

So long as the carrier excitation is sufficient, DC bias current is unnecessary, thereby reducing the thermal load of the laser device.

This invention can be more fully understood from the following detailed description when taken in conjunction with the accompanying drawings, in which.

Figure 1:
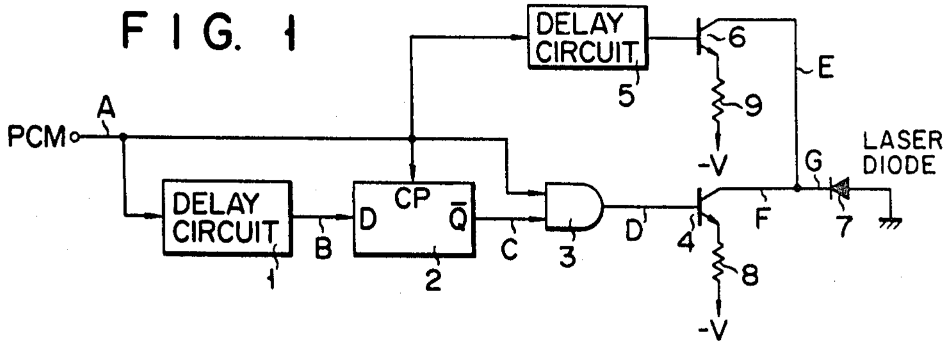
FIG. 1 is an embodiment of the semiconductor laser modulating apparatus of the present invention.

Referring now to FIG. 1, a modulating apparatus of this invention will be described. A PCM signal or coded pulse signal A having one bit duration time T is delayed by $\tau_1$ ($T/2 < \tau_1 < T$) by a delay circuit 1. A well-known D (delay)-type flip-flop circuit 2 receives the PCM signal A and output signal B of the delay circuit 1 having a phase difference therebetween as a sampling signal and an input signal respectively to generate an output signal C. Compensation voltage pulses D are produced by an AND circuit 3 which receives the sampling signal and the output signal C of the flip-flop circuit 2. The compensation voltage pulse D is delivered to the base of a transistor 4 and the PCM signal is applied to the base of a transistor 6 through a delay circuit 5. The collectors of transistors 4 and 6 are connected to the cathode of a laser diode or DH-GaAlAs laser 7, the anode of which is grounded. The emitters of the transistors 4 and 6 are coupled to the source of negative voltage (−V) through resistors 8 and 9.

Figure 2:
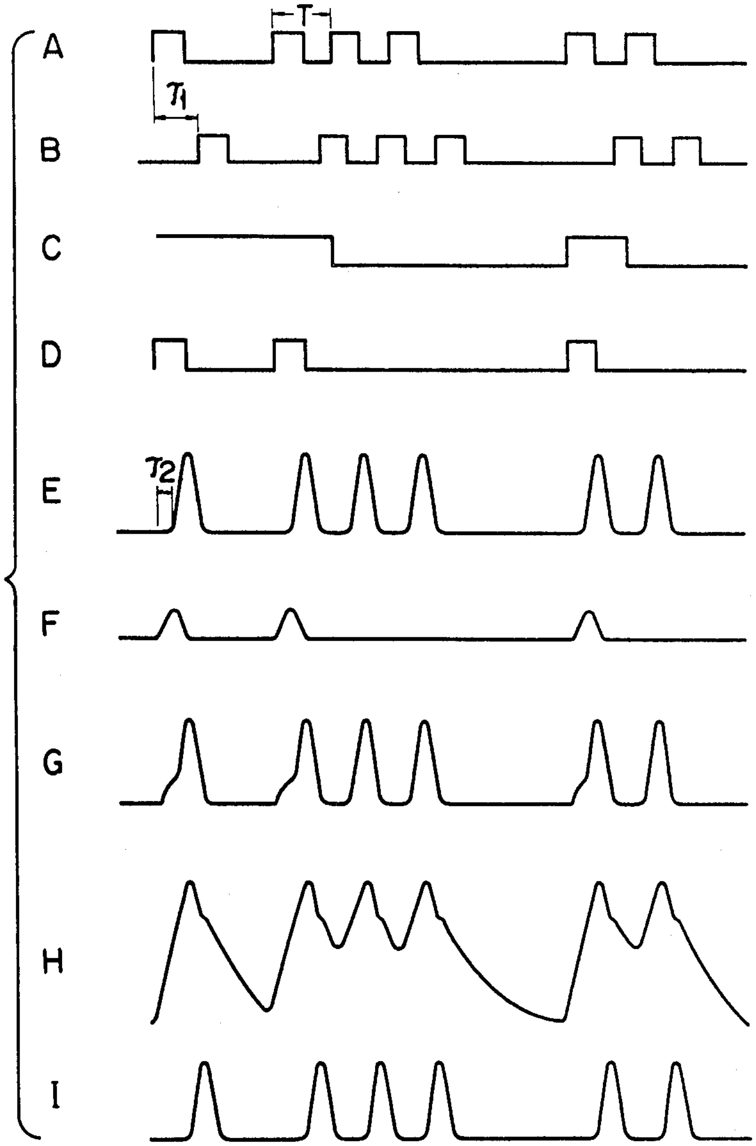
FIG. 2 shows various waveforms to explain the operation of modulating apparatus shown in FIG. 1.

Referring now to the operating waveforms of FIG. 2, the operation of the modulating apparatus of FIG. 1 will be described. The D-type flip-flop circuit 2 operates to vary level state of output Q to that of the input signal in synchronism with the rise of a sampling pulse. Assume now that, the input signal B is at the "0" level, as shown. Then the output signal C($\overline{Q}$) of the flip-flip circuit 2 becomes the "1" level in synchronism with the rise of the first pulse of the PCM signal A as a sampling signal.

At the rise of the second pulse of the sampling signal A, the input signal B is at the "0" level, thus unvarying the state of the output $\overline{Q}$ from the D-type flip-flop circuit 2. At the rise of the third pulse of the sampling signal A the input signal B is at the "1" level, so that the state of output $\overline{Q}$ from the D-type flip-flop circuit is shifted from the "1" level to the "0" level. This output state will continue until the input signal B comes to the "O" level at the rise of sampling pulse, that is, up to the rise of the fifth pulse as shown. Accordingly, the output with the waveform shown by C will be derived from the flip-flop circuit 2 which receives the sampling signal A and the input signal B. A compensation pulse train D will be taken out by feeding the sampling signal A and the output signal C of the flip-flop circuit 2 to the AND circuit 3.

The compensation pulse in this case corresponds to the succeeding modulation pulse with the "0" preceding bit in the PCM signal. In more detail, the logical conditions of two adjacent bits in the PCM signal are compared to form a compensation pulse each time the preceding bit is "0" and the succeeding bit is "1."

The PCM signal A is delayed by $\tau_2$ by the delay circuit 5 and then fed to the base of the transistor 6. As a result, the modulation current pulse shown by E will flow through the collector of the transistor 6. Since a compensation pulse D is applied to the base of the transistor 4, the compensation current pulse as indicated by F will flow through the collector of the transistor 4. Accordingly a driving current G containing the modulation current pulse E and the compensation current pulse F superposed on the former will flow through the laser diode 7. Thus the carrier density becomes as shown by H and the modulated laser outputs indicated by I without any variation in both amplitude and phase can be obtained.

Any given amplitudes of the compensation current pulse and modulation current pulse can be obtained by adjusting the emitter resistors 8 and 9 of the transistors 4 and 6 shown in FIG. 1. The optimum phase difference between the compensation current pulse and the modulation current pulse can be provided by adjusting delay time of the delay circuit 5.

In the aforementioned embodiment, one compensation pulse is generated each time the succeeding bit is "1" and the preceding bit is "0" out of two adjacent bits, that is, at every time the logical combination of "01" is obtained. It is, however, not always necessary to generate a compensation pulse at every time of combination of "01", depending on the characteristics of a laser device, particularly the oscillation delay time and/or the bit rate of PCM signal. In some cases, it is required that a compensation pulse be produced at every time of logical combination of "001" or "0001", for instance.

Figure 3:
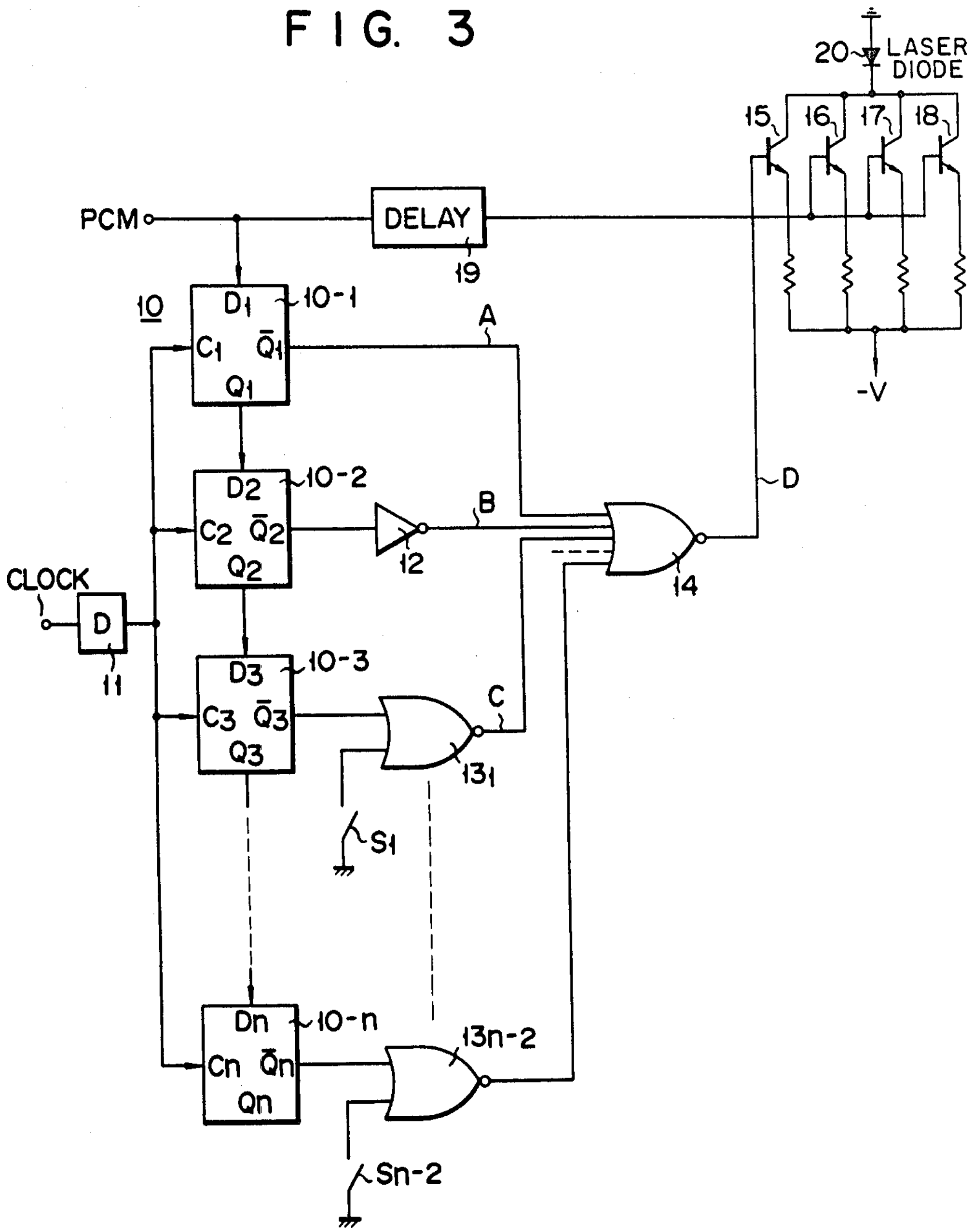
FIG. 3 is another embodiment of the present invention.

FIG. 3 shows an embodiment of the invention in which compensation pulses are generated by taking into account the logical states of a plurality of bits of the PCM signal. In this embodiment, shift register means 10 consisting of cascadeconnected n stages of one bit shift register elements 10-1, 10-2, . . . , 10-n is provided to sequentially store the logical conditions of $n$ bits of PCM signal. Each of the shift register elements consists of a D-type flip-flop circuit. Each stage is operative to read the PCM signal or the output Q of the preceding stage in synchronism with the clock signal having a predetermined phase difference relative to the PCM signal by the delay circuit 11. The output Q of each stage indicates the logical state of each bit in the PCM signal, whereas the output $\overline{Q}$ represents the opposite logical state. The output $\overline{Q}$ from the first stage 10-1 of the shift register means 10 is directly coupled to an NOR gate 14. The output $\overline{Q}_2$ of the second stage 10-2 is coupled through an inverter 12 to the NOR gate 14. The outputs $\overline{Q}$ of the succeeding stages 10-3, . . . , 10-n are coupled to the NOR gate 14 through NOR gates $13_1$, . . . . $13_{n-2}$ respectively. Other inputs of the NOR gates $13_1$, . . . , $13_{n-2}$ are grounded by means of switches $S_1$, . . . , $S_{n-2}$. Upon being turned OFF as shown, each switch actuates the corresponding NOR gate so as to generate an inverted output Q of $\overline{Q}$ output of the corresponding stage given to the another input of each NOR gate. Each switch, when ON, operates the NOR gate so that it produces a predetermined output (in this embodiment, output "0"), irrespective of the output $\overline{Q}$ of each stage. These switches $S_1$, . . . , $S_{n-2}$, and thus NOR gates $13_1$, . . . , $13_{n-2}$, are not always necessary. When it is necessary to take into account the combination of "1" and "0" of n bits of PCM signal, the outputs $\overline{Q}$ of the third and subsequent stages, like the output $\overline{Q}_2$ of the second stage 10-2, have . , to be coupled through an inverter to the NOR gate 14. . , In the embodiment of FIG. . , provided with NOR gates $13_1$, . . ., $13_{n-2}$ and switches $S_1$, . . . , $S_{n-2}$, it is possible to select the number of bits of the PCM signal to be considered. For example, when compensation pulses are to be generated by the logical combination "01" of two adjacent bits, all the switches have only to be turned ON. When compensation pulses are to be produced by the logical combination of three adjacent bits, that is, "001," the first switch $S_1$ and the remaining switches have only to be turned OFF and ON, respectively.

The outputs of NOR gate 14, i.e., compensation pulses are coupled to the base of a transistor 15. The PCM signal is coupled to the bases of transistors 16, 17 and 18 via a delay circuit 19. The collectors of transistors 15, 16, 17 and 18 are connected to the cathode of laser diode 20 and their emitters are connected to a negative power supply through emitter resistors.

Figure 4:
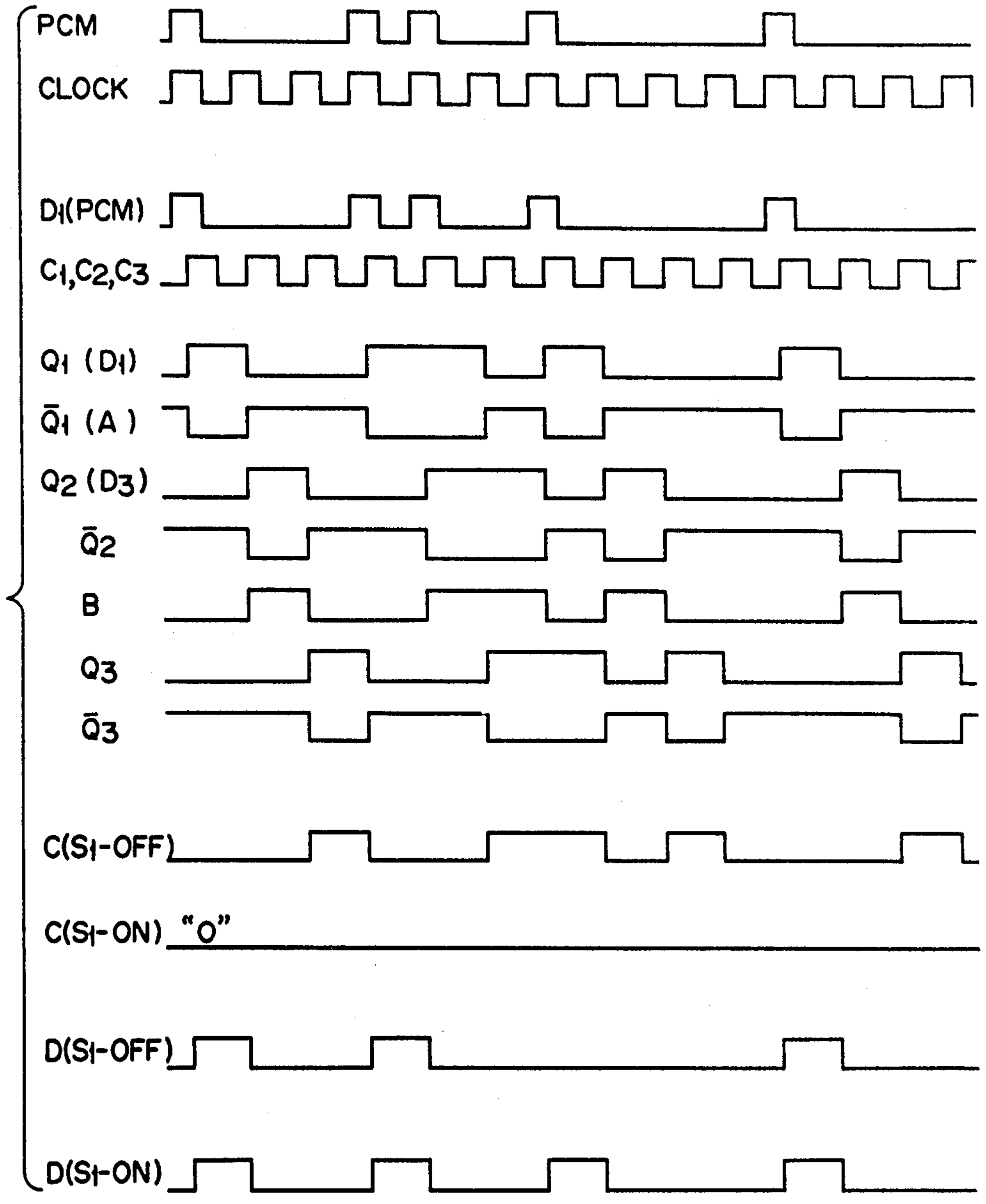
FIG. 4 shows various waveforms to explain the operation of modulating apparatus shown in FIG. 3.

Referring now to the operating waveforms of FIG. 4, the compensation pulse generating operation of the embodiment of FIG. 3 will be described in conjunction with a case where the shift register means 10 consists of three stages. Assume now that the PCM signal has the same bit rate as that of the clock signal and that these two signals are in phase as shown. The clock signal is delayed by a delay circuit 11 so as to have a predetermined phase difference with respect to the PCM signal. The first stage 10-1 of the shift register means 10 reads the logical state of the PCM signal in synchronism with the rise of the clock signal $C_1$ to generate the outputs $Q_1$ and $\overline{Q}_1$ as shown. The output $Q_1$ from the first stage 10-1 is delayed by one bit duration time of the clock signal to be read into, or shifted to, the second stage in synchronism with the clock signal $C_2$. The second stage 10-2 produces the outputs $Q_2$ and $\overline{Q}_2$ as shown. The output $Q_2$ from the second stage 10-2 is shifted to the third stage 10-3 in synchronism with the clock signal $C_3$, so that the third stage 10-3 generates the outputs $Q_3$ and $\overline{Q}_3$ as indicated. The logical states of three adjacent bits of the PCM signal are stored in the shift register means 10. If the output $Q_1$ of the first stage 10-1 is "1" in the three-bit combination "001", then the outputs $Q_2$ and $Q_3$ of the second and third stages 10-2 and 10-3 represent "0". Accordingly the outputs $\overline{Q}_1$, $\overline{Q}_2$ and $\overline{Q}_3$ of the first, second and third stages 10-1, 10-2 and 10-3 represent "0", "1" and "1", respectively. Where the switch $SW_1$ is OFF, the inputs A, B and C applied to the NOR gate 14 are all "0", thereby generating a compensation pulse. Since the input C is "1" in case of the logical combination "101" of three adjacent bits, the NOR gate produces no compensation pulse. In other words, when the switch $S_1$ is OFF, a compensation pulse is formed only when the succeeding bit is "1", and the two preceding bits are both "0" as shown.

When the switch $SW_1$ is ON, since "1" input is always applied to the NOR gate $13_1$, the output C is always "0". In the logical combination, therefore, of three adjacent bits, such as "001" or "101", the inputs A, B and C to the NOR gate 14 will all become "0", thereby forming a compensation pulse. In other words, when the switch $SW_1$ is ON, a compensation pulse is formed at each time of logical combination "01" of two adjacent bits.

What we claim is:

1. Apparatus for modulating a current-modulated semiconductor laser comprising:

a laser diode means responsive to a modulation signal current flowing therethrough to emit a laser beam;

a source of modulation signal which is pulsed on and off according to an information signal;

first circuit means responsive to said modulation signal to produce a compensation pulse when a one-bit modulation pulse arrives after one or more bit time intervals in which there exist no modulation pulses;

second circuit means connected to said laser diode means to cause a compensation current pulse to flow through said laser diode in response to said compensation pulse; and third circuit means connected to said laser diode means to cause a modulation signal current to flow through said laser diode means in response to said modulation signal.

2. Apparatus according to claim 1 wherein said first circuit means comprises a delay circuit means coupled to said modulation signal source, a delay flip-flop circuit means coupled to said delay circuit means, and a logic circuit means coupled to said modulation signal source and said delay flip-flop circuit means to produce said compensation pulse.

3. Apparatus according to claim 1 wherein said third circuit means comprises a delay circuit means.

4. Apparatus according to claim 1 wherein said first means comprises a shift register means having a plurality of stages connected in cascade for storing said modulation signal, and a logic circuit means responsive to outputs of said shift register means to produce said compensation pulse.

5. Apparatus according to claim 4 wherein each stage of said shift register means consists of a delay flip-flop circuit.

6. Apparatus according to claim 1 wherein said first circuit means comprises a shift register means having at least three stages connected in cascade for storing said modulation signal, a logic circuit means responsive to outputs of said shift register means to produce said compensation pulse, and means for selectively causing said logic circuit means to produce said compensation pulse in response to outputs of at least two preceding stages of said shift register means irrespective of output of at least one succeeding stage of said shift register means.

7. Apparatus according to claim 1 wherein said second means comprises a transistor having a collector-emitter path coupled in series with said laser diode means across a power source, and a base coupled to said first circuit means.

8. Apparatus according to claim 1 wherein said third circuit means comprises a transistor having a collector emitter path coupled in series with said laser diode means across a power source, and a base coupled to said modulation signal source.

9. A method of modulating a current-modulated semiconductor laser comprising the steps of:

supplying a modulation signal current which is pulsed on and off according to an information signal to a laser diode;

producing a compensation pulse when a one-bit modulation pulse arrives after one or more bit time intervals in which there exist no modulation pulses; and supplying a compensation current pulse to said laser diode substantially at the same time when said one-bit modulation pulse is applied to said laser diode.

10. A method according to claim 9 further comprising the step of delaying the modulation signal current relative to the compensation pulse current.

* * * * *